United States Patent [19]
>
> Dabringhaus, deceased et al.

[11] Patent Number: 4,600,342

[45] Date of Patent: Jul. 15, 1986

[54] CONTROL MEANS FOR KNEE OF METAL CUTTING APPARATUS

[76] Inventors: Gustav Dabringhaus, deceased, late of Martin County, Fla.; by Vera Dabringhaus, personal representative, 717 Redding Rd., Birmingham, Mich. 48009; Michael A. Miller, 4605 Baldwin Rd., Metamora, Mich. 48445

[21] Appl. No.: 605,071

[22] Filed: Apr. 30, 1984

[51] Int. Cl.⁴ .............................................. B23D 5/08
[52] U.S. Cl. ..................................... 409/227; 409/220
[58] Field of Search ............... 409/219, 220, 227, 206, 409/210

[56] References Cited

U.S. PATENT DOCUMENTS

| | | | |
|---|---|---|---|
| 1,467,043 | 9/1923 | Kearns | 409/220 X |
| 2,235,444 | 3/1941 | Wohlfarth et al. | 409/227 |
| 2,930,292 | 3/1960 | Gleisner | 409/227 |

*Primary Examiner*—Eugene F. Desmond

[57] ABSTRACT

A control assembly for the knee of a metal cutting apparatus which is substantially self-contained and which can be moved readily from one apparatus to another to provide a potential Z axis capability to a plurality of apparatuses with a single control assembly. The control assembly includes a lead screw removably secured at its upper end to the knee of the apparatus and extending downwardly for threaded engagement with a ball nut fixedly secured to the upper end of a sleeve journalled on a fixed hollow post. Drive means are secured to the sleeve to rotate the sleeve and nut and thereby displace the lead screw and knee vertically along the Z axis.

16 Claims, 2 Drawing Figures

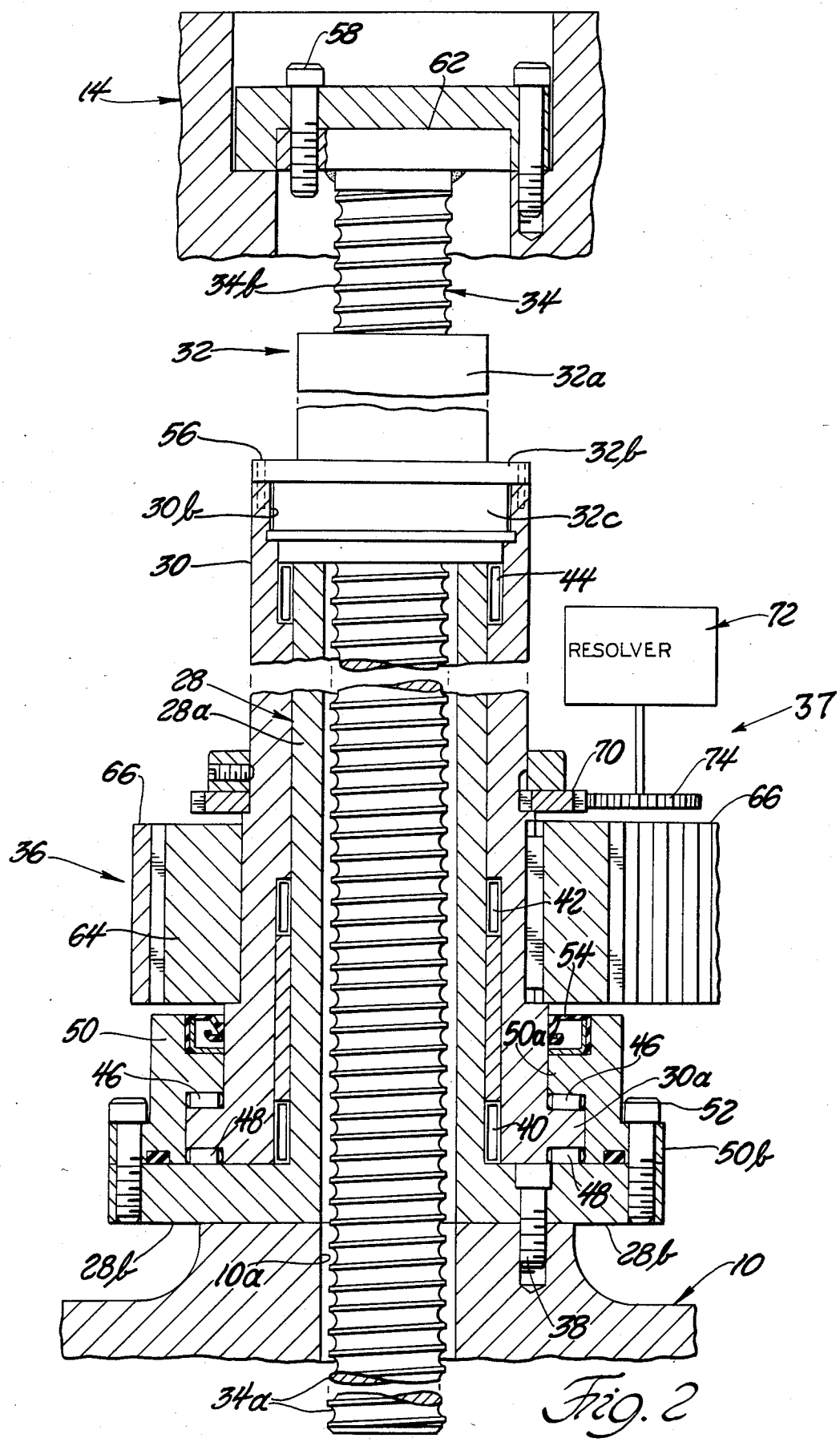

CONTROL MEANS FOR KNEE OF METAL CUTTING APPARATUS

BACKGROUND OF THE INVENTION

This invention relates to metal cutting apparatus and, more particularily to a control means for the knee of a metal cutting apparatus.

Metal cutting machines, or machining centers, typically include a table on which the work piece is positioned and means for moving the table along a plurality of axes so as to allow the milling head to selectively engage the work piece. Some machines provide only an X and Y axis capability; that is, a capability only along the horizontal axes. Other machines provide an additional capability along the Z, or vertical, axis. The Z capablility is normally provided by one of two arrangements. In one arrangement, the table is movable only along the X and Y, or horizontal, axis, and the milling head is movable along the Z, or vertical, axis. In the other arrangement, and more typically, the table is moved along all three axes with the vertical movement of the table provided by a knee member positioned beneath the table and mounted for movement on a vertical slideway. Typically, the vertical movement of the knee member, and thereby the table, is provided by a nut and lead screw arrangement with the lead screw threading into a fixed nut carried by the support base of the machine and extending upwardly into the knee where is is journaled by bearing structure provided within the knee and where it is engaged by a drive mechanism housed within the knee. The drive mechanism includes a motor and either a gear drive assembly or a belt and pulley assembly. While this arrangement is in commom usage and is generally satisfactory, the mechanism providing the Z axis capability is built into the knee of the machine and is therefore dedicated to that single machine. Accordingly, in shops employing a plurality of milling machines, each machine must have its own Z axis capability even though that capability may only be required for selected jobs. The recited arrangement, with the bearing structure for the screw and the drive mechanism for the screw housed within the knee, also provides a very heavy knee structure with the result that the mass moving on the vertical slideway during Z axis cutting operations is very high.

SUMMARY OF THE INVENTION

The present invention provides a control means, or a control assembly, for the knee of a metal cutting apparatus which is substantially self-contained and which can be moved readily from one apparatus to another to provide a potential Z axis capability to a plurality of apparatus with a single control assembly. The present invention also provides a metal cutting apparatus in which the mass of the knee is substantially reduced.

In the control means of the invention, the lead screw is fixed at its upper end to the knee and extends downwardly for threaded engagement with a nut rigidly fixed to a sleeve journaled on a fixed post, and fixed drive means are drivingly connected to the sleeve to rotate the sleeve and nut and thereby displace the lead screw and knee vertically along the Z axis. With this arrangement, the screw may be detached from the knee and the sleeve, nut, and screw assembly may be lifted off of the post for movement to another machine where the sleeve is fitted over a support post on that machine and the screw is attached to the knee of that machine, whereby to provide Z axis capability at that machine. This arrangement also substantially reduces the mass of the knee, and thereby the power required to move the knee, since the bearing support structure for the screw and the drive mechanism for the screw are now located outside of the knee and no longer form a part of the vertically reciprocating mass.

BRIEF DESCRIPTION OF THE DRAWINGS

FIG. 2 is a cross-sectional view taken on line 2—2 of FIG. 1;

DETAILED DESCRIPTION OF THE PREFERRED EMBODIMENT

Figure 1:
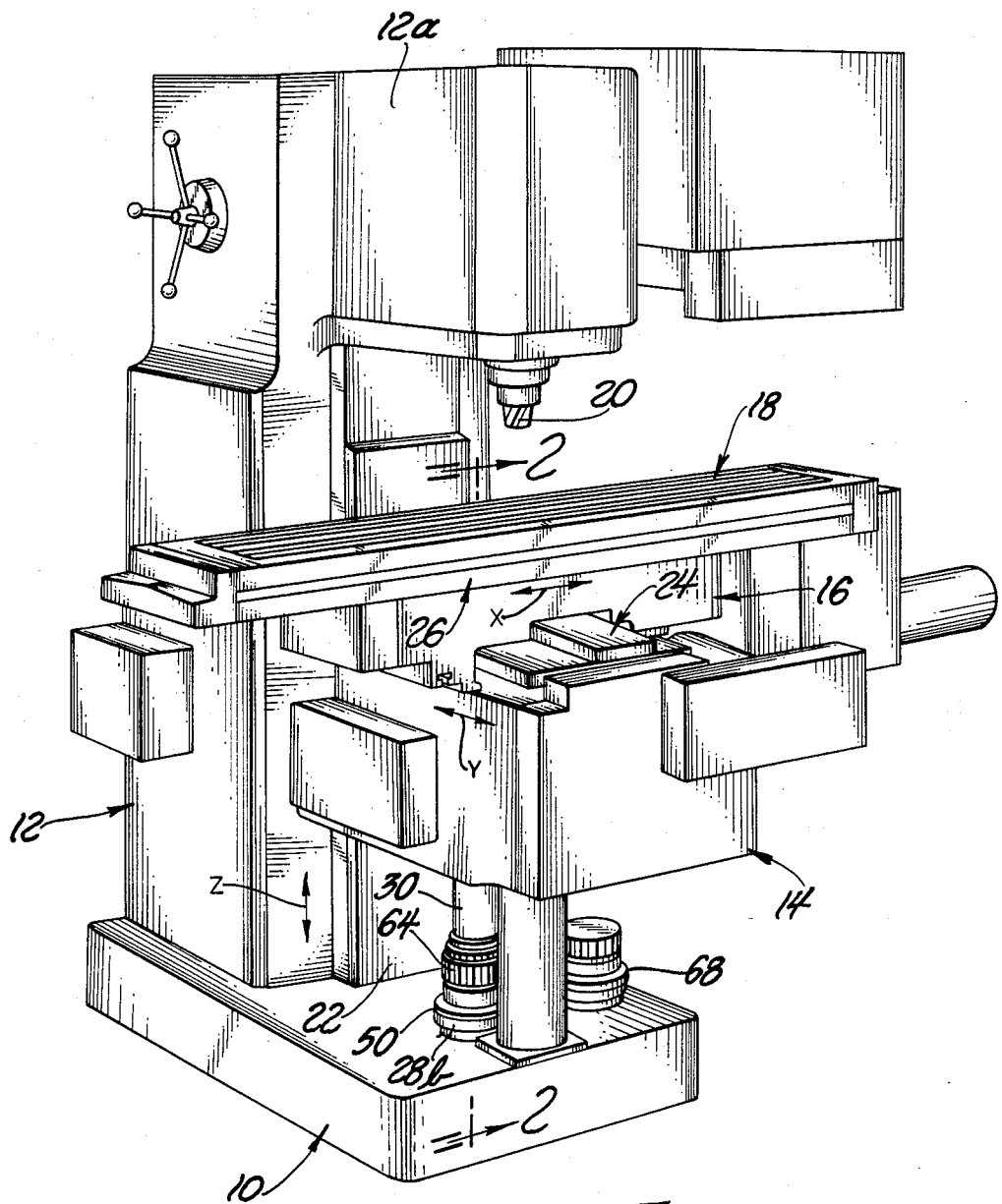
FIG. 1 is a perspective view of a metal cutting apparatus embodying the control means of the invention.

The metal cutting apparatus seen in FIG. 1 is of the type providing an X, Y, and Z axis capability. That is, the work piece may be moved selectively along either horizontal axis X or Y, as well as selectively along the vertical axis Z.

The metal cutting apparatus of FIG. 1, broadly considered, includes a support base 10, a main frame 12, a knee 14, a saddle 16, and a table 18.

Main frame 12 includes a cantilevered overhead portion 12a housing a milling head 20 positioned centrally over table 18.

Knee 14 is mounted on the front face of main frame 12 for selective vertical displacement relative to milling head 20 on a vertical or a Z axis slideway 22.

Saddle 16 is mounted on top of knee 14 for selective in and out horizontal displacement relative to milling head 20 on a horizontal Y axis slideway 24.

Table 18 is mounted on top of saddle 16 for selective back and forth horizontal displacement relative to milling head 20 on a horizontal X axis slideway 26.

The present invention concerns the control means, or control mechanism, for selectively displacing knee 14 along the Z axis slideway 22.

The invention control means is best seen in FIG. 2 and, broadly considered, includes a post 28, a sleeve 30, a nut 32, a lead screw 34, a drive mechanism 36, and a resolver assembly 37.

Post 28 includes an upstanding tubular portion 28a and a bottom flange portion 28b. Post 28 is secured in an upstanding position on support base 10 by screw bolts 38 passing through bores in post flange portion 28a for threaded engagement with tapped bores in support base 10. Sleeve 30 is journaled on upstanding tubular post portion 28a by a plurality of vertically spaced roller bearings 40, 42, 44 and by upper and lower thrust bearings 46, 48. Roller bearings 40, 42, 44 are carried on the inner periphery of sleeve 30 and, in assembly, are interposed between the outer cylindrical surface of post portion 28a and the inner cylindrical surface of sleeve 30. Thrust bearings 46, 48 are respectively positioned on the upper and lower annular surfaces of a sleeve flange portion 30a adjacent the lower end of the sleeve. Lower thrust bearing 48 is interposed between the lower annular surface of flange portion 30a and the upper annular surface of post flange portion 28b. Upper thrust bearing 46 is interposed between the upper annular surface of flange portion 30a and the lower annular surface of an internal flange portion 50a of a retainer ring 50 encircling the lower end of sleeve 30. Retainer ring 50 is secured to post flange portion 28b by screw bolts 52 passing through bores in an external flange portion 50b of the retainer ring. Retainer ring 50 thus functions to preclude vertical displacement of sleeve 30 on post 28. An oil seal 54 is seated in an annular groove in the upper end of retainer ring 50 and sealingly engages sleeve 30 to preclude loss of lubricant from the thrust bearings.

Nut 32 is rigidly mounted in the open upper end of sleeve 30. Specifically, nut 32 includes a main body portion 32a, a flange portion 32b seated on the upper annular edge of sleeve 30 and precluded from rotation relative to the sleeve by a plurality of dowels 56, and a threaded base portion 32c threaded into a tapped counter bore 30b in the upper end of sleeve 30.

Lead screw 34 is threadably received in nut 32 with its lower end 34a positioned concentrically within upstanding tubular post portion 28a and extending downwardly for passage through a hole 10a in support base 10. The upper end 34b of screw 34 passes upwardly into knee 14 and is removably secured to the knee by a plurality of screw bolts 58 received in threaded bores in a mounting flange 62 fixedly secured to the upper end of the screw.

Drive mechanism 36 includes a belt gear 64 keyed to sleeve 30 immediately above retainer ring 50, a toothed belt 66, and a drive motor 68 (FIG. 1) positioned on support base 10.

Resolver assembly 37 includes a resolver gear 70 keyed to sleeve 30 immediately above belt gear 64, and a resolver mechanism 72 carried by main frame 12 and including a drive gear 74 meshing with resolver gear 70.

In operation, motor 68 is selectively energized to selectively rotate sleeve 30 on post 28. As sleeve 30 rotates, nut 32 threadably engages lead screw 34 to selectively vertically displace screw 34 and selectively vertically displace knee 14. As sleeve 30 rotates, resolver gear 70 coacts with resolver mechanism 72 to count the number of revolutions undergone by the sleeve and nut and thereby provide an accurate measure or record of the vertical distance through which the knee has been displaced. When it is desired to provide Z axis capability to another metal cutting machine, bolts 52 and 58 are respectively loosened to disconnect the invention control mechanism from the support base and knee, respectively, and drive mechanisms 36 and resolver mechanism 37 are suitably disengaged. The invention control mechanism, comprising sleeve 30, nut 32, lead screw 34, drive gear 64, resolver gear 70, and retainer ring 50, may now be lifted off of post 28 and moved to the other machine where the sleeve is fitted over a support post at that machine, the screw is secured to the knee of that machine, and the retainer ring is secured to the post of that machine. The drive mechanism and the resolver mechanisms at the new machine are now drivingly connected to the belt gear 64 and resolver gear 70, respectively, and the new machine is now ready for use with a Z axis capability. In addition to the Z axis interchangability thus provided, the invention control means removes the weight and bulk of the bearing structure and drive mechanism for the screw from the knee so that the reciprocating mass in Z axis operation is substantially reduced with a consequent reduction in the Z axis power requirements.

While a preferred embodiment of the invention has been illustrated and described in detail, it will be apparent that various changes may be made in the disclosed embodiment without departing from the scope or spirit of the invention.

The embodiments of the invention in which an exclusive property or privilege is claimed are defined as follows:

1. Control means for controlling vertical movement of the knee of a metal cutting apparatus along the "Z" axis comprising:
   (A) a fixed, upstanding, hollow support post;
   (B) a sleeve telescopically received over said post and journalled for rotation on said post;
   (C) a nut member fixedly secured to the upper end of said sleeve;
   (D) a lead screw member threadably received in said nut and extending downwardly from said nut within said hollow support post and upwardly from said nut for attachment to the knee; and
   (E) drive means drivingly connected to said sleeve to rotate the latter and thereby said nut member to displace said lead screw member, and thereby the knee, vertically along said "Z" axis.

2. Control means according to claim 1 and further comprising:
   (F) resolution means drivingly connected to said sleeve to count the number of revolutions of the latter and said nut member to determine the amount of displacement of said lead screw member and the knee vertically along said Z axis.

3. Control means according to claim 1 wherein:
   (F) said drive means comprises motor means including a drive pulley, a driven pulley fixed to said sleeve for rotation with the latter, and belt means operatively drivingly interconnecting said drive and driven pulleys.

4. In a metal cutting apparatus of the type comprising a support base, a knee mounted on said support base for vertical movement along a "Z" axis, a table mounted on said knee for horizontal movement along "X" and "Y" axes disposed at right angles to each other and to the "Z" axis, and control means for controlling movement of said knee along said "Z" axis, the improvement wherein said control means comprises:
   (A) a fixed, hollow support post fixedly mounted on said support base and extending vertically upwardly therefrom toward said knee;
   (B) a sleeve telescopically received over said post and journalled for rotation on said post;
   (C) a nut member fixedly secured to the upper end of said sleeve;
   (D) a lead screw member threadably received in said nut and extending downwardly from said nut within said hollow support post and upwardly from said nut for attachment to said knee; and
   (E) drive means mounted on said support base and operatively drivingly connected to said sleeve to rotate the latter and said nut member to displace said lead screw member and knee vertically along said "Z" axis.

5. A metal cutting apparatus according to claim 4 wherein:
   (F) said drive means comprises motor means supported on said support base and including a drive pulley, a driven pulley fixed to said sleeve for rotation with the latter, and belt means operatively drivingly interconnecting said drive and driven pulleys.

6. A metal cutting apparatus according to claim 5 and further including:
   (G) resolution means operatively supported on said support base and drivingly connected to said sleeve to count the number of revolutions of the latter and said nut member to determine the amount of displacement of said lead screw member and knee vertically along said "Z" axis.

7. A metal cutting apparatus according to claim 6 wherein:
(H) said resolution means includes a driven gear, and a driving gear fixed to said sleeve for rotation with the latter and drivingly connected with said driven gear.

8. A control mechanism for controlling the vertical movement along the "Z" axis of the knee of a metal cutting apparatus, said control mechanism comprising:
(A) a sleeve adapted to be telescopically and journally received over an upstanding tubular support post defined by the base structure of the apparatus;
(B) retainer means on the lower end of said sleeve for precluding vertical movement of said sleeve on the post;
(C) a nut fixedly secured to the upper end of said sleeve;
(D) a lead screw threadably received in said nut and adapted to extend downwardly therefrom concentrically within the post;
(E) mounting means on the upper end of said screw for removably securing said screw to the knee of the apparatus; and
(F) drive means encircling said sleeve below said nut and above said retainer means and adapted for coaction with another drive member to selectively rotate said sleeve and selectively vertically displace said screw and the knee of the apparatus along the "Z" axis.

9. A control mechanism according to claim 8 wherein said nut includes a main body portion extending upwardly from the upper end of said sleeve and a threaded base portion threadably received in a tapped bore in the upper end of said sleeve.

10. A control mechanism according to claim 8 and further including:
(G) bearing means carried on the internal periphery of said sleeve for journalling said sleeve on the upstanding support post.

11. A control mechanism for controlling the vertical movement along the Z axis of the knee of a metal cutting apparatus, said control mechanism comprising:
(A) a sleeve adapted to be telescopically received over an upstanding tubular support post defined by the base structure of the apparatus;
(B) bearing means carried on the internal periphery of said sleeve for journalling said sleeve on the post;
(C) a ring member encircling the lower end of said sleeve and including an external annular portion adapted to receive fastener elements for securing said ring member to the base structure of the apparatus and an internal flange portion overlying an external flange portion on said sleeve to preclude vertical movement of the sleeve on the post;
(D) a first thrust bearing positioned between the lower annular surface of the internal flange portion of said ring member and the upper annular surface of the external flange portion of said sleeve;
(E) a second thrust bearing positioned between the lower annular surface of the sleeve flange portion and the confronting annular surface of the base structure of the apparatus;
(F) a helical ball nut including a threaded base portion threadably received in a tapped bore in the upper end of said sleeve and a main body portion extending upwardly from said base portion;
(G) a helical lead screw threadably received in said nut and adapted to extend downwardly therefrom concentrically within said post;
(H) mounting means on the upper end of said screw for removably securing said screw to the knee of the apparatus; and
(I) an annular drive member secured around said sleeve at a location above said ring member and adapted to coact with another drive member to selectively rotate said sleeve and selectively vertically displace said screw and the knee of the apparatus along the Z axis.

12. A control mechanism for controlling movement along the "Z" axis of the knee of a metal cutting apparatus, said control mechanism comprising:
(A) a sleeve adapted to be telescopically and journally received over an upstanding tubular support post defined by the base structure of the apparatus;
(B) a ring member encircling the lower end of said sleeve and including an external annular portion adapted to received fastener elements for securing said ring member to the base structure of the apparatus and an internal flange portion overlying an external flange portion on said sleeve to preclude vertical movement of said sleeve on the post;
(C) a nut fixedly secured to the upper end of said sleeve;
(D) a lead screw threadably received in said nut and adapted to extend downwardly therefrom concentrically within the post;
(E) mounting means on the upper end of said screw for removably securing said screw to the knee of the apparatus; and
(F) drive means encircling said sleeve and adapted for coaction with another drive member to selectively rotate said sleeve and selectively vertically displace said screw and the knee of the apparatus along the "Z" axis.

13. A control mechanism according to claim 12 wherein:
(G) a first thrust bearing is positioned between the lower annular surface of the internal flange portion of said ring member and the upper annular surface of the external flange portion of said sleeve; and
(H) a second thrust bearing is positioned between the lower annular surface of the sleeve flange portion and the confronting annular surface of the base structure of the apparatus.

14. A control mechanism according the claim 13 wherein:
(I) an oil ring is seated in an annular groove in the upper end of said ring member and sealingly encircles said sleeve to preclude loss of lubricant from said thrust bearings.

15. A control mechanism according to claim 14 wherein:
(J) said drive means comprises a belt drive gear secured to said sleeve at a location above said ring member.

16. A control mechanism according to claim 15 and further including:
(K) a resolver gear keyed to said sleeve at a location above said belt drive gear and adapted to coact with a resolver mechanism to provide a record of the number of revolutions undergone by said sleeve.

* * * * *